United States Patent
So et al.

(10) Patent No.: US 11,019,479 B2
(45) Date of Patent: *May 25, 2021

(54) TECHNIQUE FOR ESTABLISHING A MESH NETWORK

(71) Applicant: ARRIS Enterprises LLC, Suwanee, GA (US)

(72) Inventors: Wilson So, Sunnyvale, CA (US); Steve Lee, Mountain View, CA (US); Ki-Young Jang, Sunnyvale, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/723,694

(22) Filed: Dec. 20, 2019

(65) Prior Publication Data

US 2020/0128387 A1 Apr. 23, 2020

Related U.S. Application Data

(63) Continuation of application No. 15/469,496, filed on Mar. 25, 2017, now Pat. No. 10,542,408.

(51) Int. Cl.
*H04W 8/00* (2009.01)
*H04L 5/00* (2006.01)

(52) U.S. Cl.
CPC .......... *H04W 8/005* (2013.01); *H04L 5/0044* (2013.01); *H04L 5/0048* (2013.01); *H04L 5/0075* (2013.01)

(58) Field of Classification Search
CPC ... H04W 40/12; H04W 40/32; H04W 28/021; H04W 84/18; H04W 8/005; H04L 45/24; H04L 5/0044; H04L 5/0048; H04L 5/0075

See application file for complete search history.

(56) References Cited

U.S. PATENT DOCUMENTS 6,574,669 B1 * 6/2003 Weaver .................. H04L 45/00
　　　　　　　　　　　　　　　　　　　　　 370/252
6,848,006 B1 * 1/2005 Hermann ............ H04J 14/0227
　　　　　　　　　　　　　　　　　　　　　 398/24

(Continued)

OTHER PUBLICATIONS

Irfan Sheriff and Elizabeth Belding-Royer, Multipath Selection in Multi-Radio Mesh Networks, Broadband Communications, Networks and Systems 2006, Broadnets 2006, 3rd International Conference on IEEE, Piscataway, NJ, USA, Oct. 1, 2006. pp. 1-11.

(Continued)

*Primary Examiner* — Wutchung Chu
(74) *Attorney, Agent, or Firm* — Steven Stupp; Stewart Wiener

(57) ABSTRACT

In order to establish a mesh network, an electronic device may iteratively identify one or more mesh-network nodes and may determine associated duty-cycle ratios based on communication with the one or more mesh-network nodes. In particular, the electronic device may select candidate mesh-network nodes based on estimated throughput metrics of their communication with a root device in the mesh network. Then, for each of the candidate mesh-network nodes, the electronic device may associate with a given candidate mesh-network node, and may measure the throughput of the given candidate mesh-network node during a time interval by communicating packets. Based on comparisons of the measured throughputs, the electronic device may identify the one or more mesh-network nodes in the candidate mesh-network nodes and may determine the associated duty-cycle ratios. Subsequently, the electronic device communicates information with the root device via the one or more mesh-network nodes based on the duty-cycle ratios.

20 Claims, 5 Drawing Sheets

(56) References Cited

U.S. PATENT DOCUMENTS

| | | | |
|---|---|---|---|
| 7,701,902 B1* | 4/2010 | Possley | H04W 72/1221 370/329 |
| 9,763,088 B2 | 9/2017 | Lin | |
| 9,774,580 B2 | 9/2017 | Lin | |
| 9,979,626 B2* | 5/2018 | Kish | H04L 45/00 |
| 2007/0153702 A1* | 7/2007 | Khan Alicherry | H04W 72/082 370/252 |
| 2007/0297366 A1* | 12/2007 | Osann | H04W 40/06 370/331 |
| 2008/0151824 A1* | 6/2008 | Shorty | H04L 29/06027 370/329 |
| 2008/0198829 A1* | 8/2008 | Cheng | H04W 72/044 370/342 |
| 2011/0069686 A1* | 3/2011 | Raman | H04L 12/413 370/338 |
| 2011/0119360 A1 | 5/2011 | Kish | 709/221 |
| 2012/0188934 A1* | 7/2012 | Liu | H04L 1/004 370/312 |
| 2012/0281526 A1* | 11/2012 | Singamsetty | H04L 45/22 370/225 |
| 2014/0219078 A1* | 8/2014 | Dasgupta | H04L 45/08 370/219 |
| 2015/0326633 A1* | 11/2015 | Chang | H04L 65/60 709/219 |
| 2016/0192203 A1* | 6/2016 | Gokturk | H04L 41/083 370/254 |
| 2017/0078189 A1* | 3/2017 | Han | H04L 45/20 |
| 2020/0025629 A1* | 1/2020 | Zinger | G06F 16/288 |

OTHER PUBLICATIONS

Extended European Search Report, European Patent Appl. 19204950. 0, dated Feb. 5, 2020.

* cited by examiner

TECHNIQUE FOR ESTABLISHING A MESH NETWORK

BACKGROUND

Field

The described embodiments relate to techniques for establishing a wireless mesh network. In particular, the described embodiments relate to techniques for selecting intermediate nodes in a wireless mesh network.

Related Art

Many electronic devices are capable of wirelessly communicating with other electronic devices. For example, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth from the Bluetooth Special Interest Group of Kirkland, Wash.), and/or another type of wireless network.

One approach to wireless communication is a wireless mesh network (which is henceforth referred to as a 'mesh network'). In a mesh network, multiple electronic devices (which are sometimes referred to as 'nodes') are organized in a mesh topology in which electronic devices communicate with each other via zero or more intermediate electronic devices or nodes. Typically, an electronic device in a mesh network communicates with its nearest neighbor(s). In a mesh network, the communication between two electronic devices via an intermediate electronic device or node is referred to as 'one-hop' communication, while the communication between the two electronic devices via two intermediate electronic devices or nodes is referred to as 'two-hop' communication. Similarly, the communication between the two electronic devices via N intermediate electronic devices or nodes is referred to as 'N-hop' communication.

Mesh networks can have decentralized node associations, with no central server or management dictating the mesh-network topology. While this architecture is relatively inexpensive, and is reliable and resilient, it can pose challenges. In particular, it can be difficult to organize or assemble the electronic devices into a mesh network.

SUMMARY

The described embodiments relate to an electronic device that establishes a mesh network. This electronic device includes an interface circuit that communicates with two or more electronic devices to establish the mesh network. During operation, the electronic device selects candidate mesh-network nodes based on estimated throughput metrics of the two or more electronic devices to a root device in the mesh network. Then, for each of the candidate mesh-network nodes, the electronic device: associates with a given candidate mesh-network node; measures the throughput of the given candidate mesh-network node during a time interval by communicating packets; and stores the measured throughput of the given candidate mesh-network node (e.g., in a computer-readable memory). Moreover, the electronic device compares the measured throughputs, identifies one or more mesh-network nodes in the candidate mesh-network nodes and determines associated duty-cycle ratios based on the comparisons. Furthermore, the electronic device communicates information with the root device via the one or more mesh-network nodes based on the duty-cycle ratios (e.g., packets are communicated to the root device via the one or more mesh-network nodes). Thus, the measured throughputs may be used to select the one or more mesh-network nodes that result in the best performance in the mesh network at a given time.

Note that an estimated throughput metric of the given candidate mesh-network node is based on one of: a received signal strength indication (RSSI), airtime usage by the given candidate mesh-network node, and an advertised throughput associated with the given candidate mesh-network node. Moreover, at least one of the airtime usage and the advertised throughput may be included in beacons communicated in the mesh network.

For example, the estimated throughput metric of the given candidate mesh-network node may correspond to a throughput between the given candidate mesh-network node and the root device in the mesh network and a throughput metric between the given candidate mesh-network node and the electronic device.

Furthermore, the measured throughput may include an uplink throughput. In some embodiments, the measured throughput corresponds to one hop in the mesh network.

Additionally, the associating, measuring and storing may be performed in a round-robin fashion for the candidate mesh-network nodes.

When a measured throughput of a candidate mesh-network node exceeds the other measured throughputs by a predefined value, the one or more mesh-network nodes may include the candidate mesh-network node and the associated duty-cycle ratio may be one hundred percent (i.e., subsequent communication may occur via this candidate mesh-network node). Alternatively, when maximum measured throughputs, which are associated with at least two candidate mesh-network nodes, are within the predefined value of each other, the one or more mesh-network nodes may include at least the two candidate mesh-network nodes and the associated duty-cycle ratios may be based on ratios of the measured throughputs of at least the two candidate mesh-network nodes (i.e., subsequent communication may occur via these candidate mesh-network nodes).

Note that the associating, measuring, storing, comparing, identifying, determining and communicating may be repeated until a convergence criterion is achieved.

Moreover, the one or more mesh-network nodes may be identified and the duty-cycle ratios may be determined using Bayesian analysis.

Furthermore, the electronic device and the two or more electronic devices may include access points.

In some embodiments, the electronic device includes: a processor; and a memory, coupled to the processor, which stores a program module that is executed by the processor. This program module may include instructions for at least some of the operations performed by the electronic device (i.e., at least some of the operations performed by the electronic device may be performed using software).

Moreover, the electronic device may include an antenna coupled to the interface circuit.

Another embodiment provides a computer-program product for use with the electronic device. This computer-program product includes instructions for at least some of the operations performed by the electronic device.

Another embodiment provides a method for establishing a mesh network. This method includes at least some of the operations performed by the electronic device.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

In order to establish a mesh network association with a mesh-network node, an electronic device may iteratively identify one or more mesh-network nodes and may determine associated duty-cycle ratios based on communication with the one or more mesh-network nodes. In particular, the electronic device may select candidate mesh-network nodes based on estimated throughput metrics of their communication with a root device in the mesh network. Then, for each of the candidate mesh-network nodes, the electronic device may associate with a given candidate mesh-network node, and may measure the throughput of the given candidate mesh-network node during a time interval by communicating packets. Based on comparisons of the measured throughputs, the electronic device may identify the one or more mesh-network nodes in the candidate mesh-network nodes and may determine the associated duty-cycle ratios. Subsequently, the electronic device communicates information with the root device via the one or more mesh-network nodes based on the duty-cycle ratios (e.g., packets are communicated to the root device via the one or more mesh-network nodes). This may allow that analysis to be refined so that one of the mesh-network nodes can be selected for use in subsequent communication of packets between the electronic device and the root device in the mesh network.

In some embodiments, the electronic device repeats the aforementioned operations one or more times (e.g., iteratively or periodically). This may allow the electronic device to facilitate establishment of the mesh network, as well as maintaining an optimal configuration or architecture in the mesh network. In particular, the electronic device may use the measured throughputs to select the one or more mesh-network nodes that result in the best performance in the mesh network at a given time. For example, the electronic device may: maximize the throughput between the electronic device and the root device), recover from failure, and/or adapt to a changing radio-frequency environment.

In the discussion that follows the electronic devices include radios that communicate packets in accordance with a communication protocol, such as an Institute of Electrical and Electronics Engineers (IEEE) 802.11 standard (which is sometimes referred to as 'Wi-Fi®,' from the Wi-Fi Alliance of Austin, Tex.), Bluetooth (from the Bluetooth Special Interest Group of Kirkland, Wash.), and/or another type of wireless interface (such as another wireless-local-area-network interface). In the discussion that follows, Wi-Fi is used as an illustrative example. However, a wide variety of communication protocols may be used.

Figure 1:
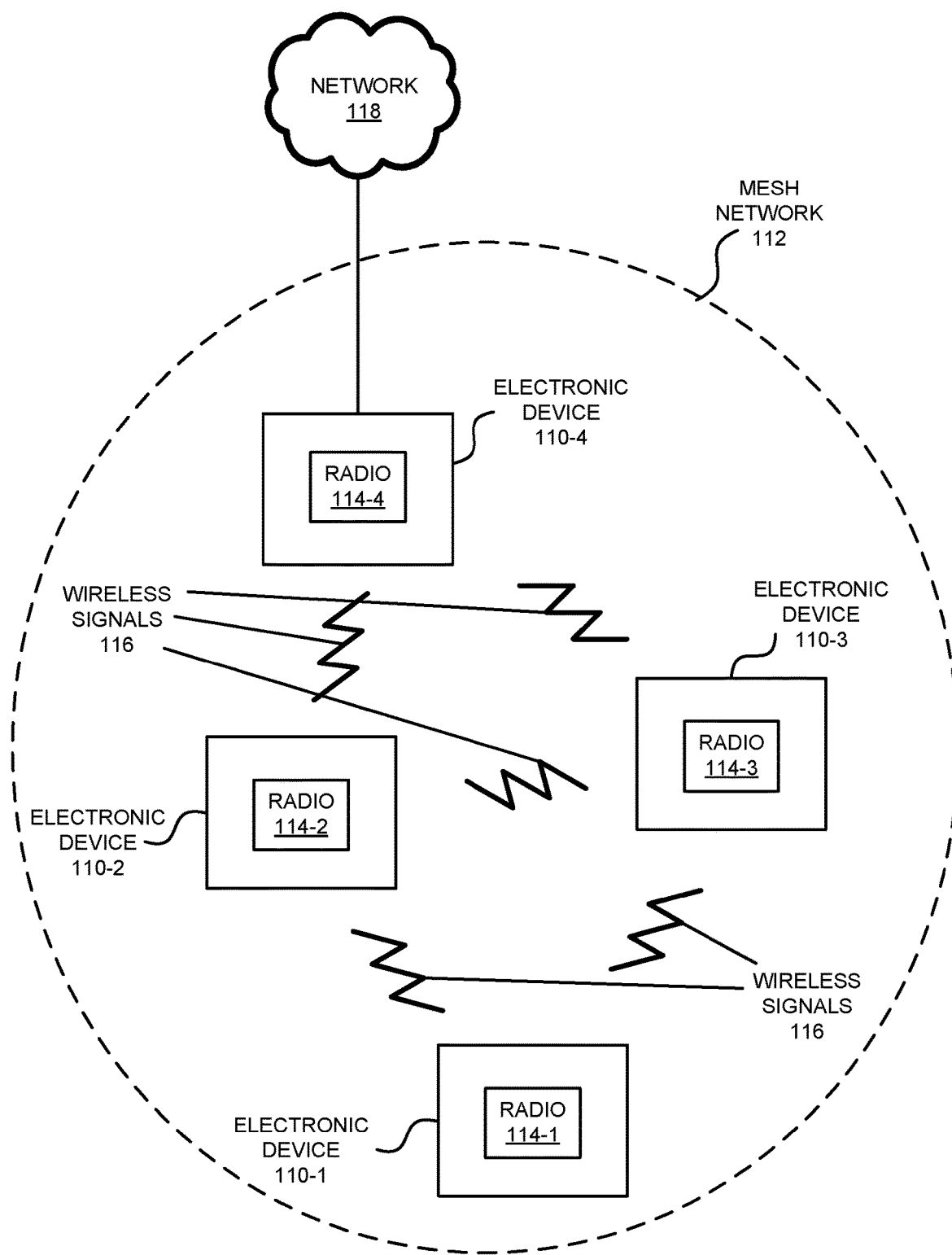
FIG. 1 is a block diagram illustrating electronic devices wirelessly communicating in accordance with an embodiment of the present disclosure.

Communication among electronic devices is shown in FIG. 1, which presents a block diagram illustrating electronic devices 110 (such as access points) wirelessly communicating in a mesh network 112 according to some embodiments. In particular, these electronic devices may wirelessly communicate while: transmitting advertising frames on wireless channels, detecting one another by scanning wireless channels, establishing connections (for example, by transmitting association requests), and/or transmitting and receiving packets (which may include the association requests and/or additional information as payloads).

Figure 5:
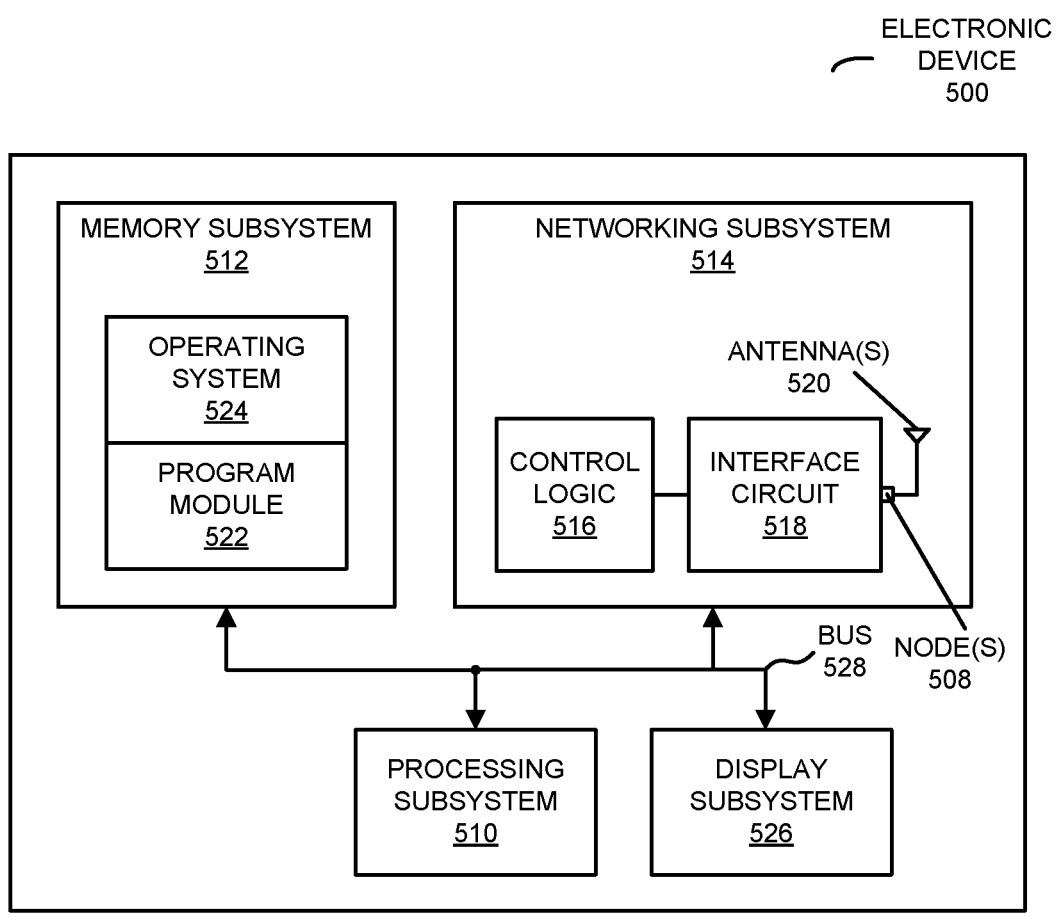
FIG. 5 is a block diagram illustrating one of the electronic devices of FIG. 1 in accordance with an embodiment of the present disclosure.

As described further below with reference to FIG. 5, electronic devices 110 may include subsystems, such as a networking subsystem, a memory subsystem and a processor subsystem. In addition, electronic devices 110 may include radios 114 in the networking subsystems. More generally, electronic devices 110 can include (or can be included within) any electronic devices with the networking subsystems that enable electronic devices 110 to wirelessly communicate with each other. This wireless communication can comprise transmitting advertisements on wireless channels to enable electronic devices to make initial contact or detect each other, followed by exchanging subsequent data/management frames (such as association requests and responses) to establish a connection, configure security options (e.g., Internet Protocol Security), transmit and receive packets or frames via the connection, etc.

As can be seen in FIG. 1, wireless signals 116 (represented by jagged lines) are transmitted by radios 114 in electronic devices 110. For example, radio 114-1 in electronic device 110-1 may transmit information (such as packets) using wireless signals. These wireless signals are received by radios 114 in one or more other electronic devices (such as electronic devices 110-2 and 110-3). This may allow electronic device 110-1 to communicate information to electronic devices 110-2 and/or 110-3. Furthermore, electronic devices 110-2 and/or 110-3 may wirelessly transmit packets to electronic device 110-4, which is a root device in mesh network 112. This root device may couple mesh network 112 to a wired network 118, such as the Internet and/or an intranet. Note that electronic device 110-1 may access network 118 via at least one of electronic devices 110-2 and 110-3, and electronic device 110-4. Thus, electronic device 110-1 may access network 118 via one hop (such as via electronic device 110-2 or electronic device 110-3, which then communicates with electronic device 110-4) or two hops (such as via electronic device 110-2, which communicates with electronic device 110-3, which in turn communicates with electronic device 110-4) in mesh network 112.

Note that the communication among electronic devices 110 (such as between at least any two of electronic devices 110) may be characterized by a variety of performance metrics, such as: a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). In some embodiments, the communication among electronic devices 110 (such as between at least any two of electronic devices 110) is characterized by an error-rate model, which compares the error rate during communication at the data rate.

However, it can be difficult to organize electronic devices 110 into mesh network 112. For example, it can be difficult to select the appropriate intermediate node(s) in mesh network 112 between electronic device 110-1 and electronic device 110-4 (which are henceforth referred to as mesh-network nodes) to optimize at least one performance metric (such as the throughput between electronic device 110-1 and electronic device 110-4) in the presence of either static or dynamic radio frequency environments. In addition, the performance during the communication may change or degrade (e.g., there may be too many electronic devices communicating with one of the mesh-network nodes, the amount of information that electronic device 110-1 needs to communicate with the mesh-network node(s) may exceed the capacity, there may be interference or movement, and/or there may be another factor that may affect the performance, etc.). Therefore, the appropriate mesh-network node(s) may need to be changed based on current conditions in mesh network 112, but once again it can be difficult to select the appropriate mesh-network node(s) to maintain or optimize the performance. If the mesh-network node(s) is selected incorrectly, there may be a significant opportunity cost in degraded or sub-optimal performance in mesh network 112, which, in turn, may increase the number of packets that are resent and, thus, may increase the latency of the communication and may degrade the experience of a user of electronic device 110-1.

In order to address this problem, electronic device 110-1 may implement a communication technique (which is described further below with reference to FIGS. 2-4). In particular, electronic device 110-1 may select candidate mesh-network nodes (such as electronic devices 110-2 and 110-3) based on estimated throughput metrics of electronic devices 110-2 and 110-3 to a root device (i.e., electronic device 110-4) in mesh network 112. Note that an estimated throughput metric of the given candidate mesh-network node (such as electronic device 110-2) may be based on: a received signal strength indication (RSSI); and airtime usage by the given candidate mesh-network node, and/or an advertised throughput associated with the given candidate mesh-network node. Moreover, at least one of the airtime usage and the advertised throughput may be included in beacons communicated in mesh network 112. For example, the RSSI may be mapped (using a predefined table of RSSI and throughput values) to an estimated throughput metric, so that 70 dB is mapped to 400 Mb/s. In some embodiments, such as when the airtime usage is less than 60%, the advertised throughputs in beacons are used to calculate the estimated throughput metric. In particular, the estimated throughput metric of the given candidate mesh-network node may correspond to a throughput between the given candidate mesh-network node and the root device ($T_{RD}$) in mesh network 112 and a throughput metric between the given candidate mesh-network node and electronic device 110-1 ($T_{IN}$). For example, the estimated throughput metric may be $$\frac{1}{(T_{RD})^{-1} + (T_{IN})^{-1}}.$$

Then, for each of the candidate mesh-network nodes, electronic device 110-1: associates with a given candidate mesh-network node (such as electronic device 110-2); measures the throughput (and, more generally, a throughput metric) of the given candidate mesh-network node during a time interval (such as 10 s, 1 minute or 3 minutes) by communicating packets; and stores the measured throughput of the given candidate mesh-network node (e.g., in a computer-readable memory). For example, a measured throughput may be an uplink throughput via electronic devices 110-2 or 110-3 to electronic device 110-4 (such as an uplink throughput associated with at least one hop in mesh network 112). Note that the associating, measuring and storing may be performed in a round-robin fashion for the candidate mesh-network nodes (e.g., first for electronic device 110-2 and then for electronic device 110-3).

Moreover, electronic device 110-1 compares the measured throughputs, identifies one or more mesh-network nodes in the candidate mesh-network nodes and determines associated duty-cycle ratios based on the comparisons. For example, as described further below with reference to FIG. 3, when a measured throughput of a candidate mesh-network node exceeds the other measured throughputs by a predefined value (such as 5, 10 or 20%), the one or more mesh-network nodes may include the candidate mesh-network node and the associated duty-cycle ratio may be one hundred percent (i.e., subsequent communication may occur via this candidate mesh-network node, such as electronic device 110-2 or 110-3). Alternatively, when maximum measured throughputs, which are associated with at least two candidate mesh-network nodes (such as electronic devices 110-2 and 110-3), are within the predefined value of each other, the one or more mesh-network nodes may include at least the two candidate mesh-network nodes and the associated duty-cycle ratios may be based on ratios of the measured throughputs of at least the two candidate mesh-network nodes (i.e., subsequent communication may occur via these candidate mesh-network nodes).

Furthermore, electronic device 110-1 may communicate information (such as packets) with the root device via the one or more mesh-network nodes based on the duty-cycle ratios. (As noted previously, this may allow that analysis to be refined so that one of the mesh-network nodes can be selected for use in subsequent communication of packets between the electronic device and the root device in the mesh network.) For example, if electronic devices 110-2 and 110-3 are identified as mesh-network nodes, electronic device 110-1 may communicate the information by time-domain multiplexed communication of the information with electronic devices 110-2 and 110-3. Thus, if a duty-cycle ratio of electronic device 110-2 is 40% and a duty-cycle ratio of electronic device 110-3 is 60%, electronic device 110-1 may communicate packets with electronic device 110-2 40% of the time and may communicate packets with electronic device 110-3 60% of the time. Thus, the communication times with electronic devices 110-2 and 110-3, respectively, may be determined by scaling a time interval by the duty-cycle ratios of electronic devices 110-2 and 110-3.

Note that the associating, measuring, storing, comparing, identifying, determining and communicating may be repeated by electronic device 110-1 until a convergence criterion is achieved. For example, electronic device 110-1 may repeat these operations after a time interval (such as 3 minutes) until the determined duty-cycle ratios in three consecutive iterations are within 5, 10 or 20% of each other. Thus, the mesh-network nodes may be determined iteratively and dynamically (as opposed to selecting mesh-network nodes based on a static performance metric or based on a static criterion). In addition, the communication technique may be repeated as needed (such as when the throughput in mesh network 112 degrades by more than 10 or 20% for 10 s, 1 minute or 3 minutes) and/or regularly or periodically (such as every hour or once a day).

Moreover, a variety of analysis techniques may be used to identify the mesh-network nodes and to determine the duty-cycle ratios. For example, the one or more mesh-network nodes may be identified and the duty-cycle ratios may be determined using Bayesian analysis. Alternatively or additionally, an optimization technique may be used, such as: the simplex technique, Newton's method, a quasi-Newton method, steepest descents, a genetic technique, simulated annealing, etc.

While the preceding discussion illustrated establishing (and maintaining) mesh network 112 based on estimated throughput metrics and measured throughputs, in other embodiments one or more additional or different performance metrics may be used. For example, electronic device 110-1 may track data rates during communication in mesh network 112 (which may be specified by interface circuits in electronic device 110-1 and electronic devices 110-2 and 110-3) and may receive feedback about the communication from electronic devices 110-2 and 110-3 (such as whether packets were successfully received based on acknowledgment messages). Moreover, electronic device 110-1 may determine an observed distribution of the data rates (such as data rate as a function of percentage or percentile of the communication, e.g., 5% of the communicated packets, etc.), which is an illustration of a throughput metric. In particular, the observed distribution may be sorted (such as percentile ranks of the observed distribution), e.g., into a histogram. However, the observed distribution may be other than a histogram. Note that, in general, an 'observed distribution' may include a collection of observed value samples from a random process (e.g., the measured throughput) that may be sorted from best to worst (or vice versa). Furthermore, the observed value samples may be decimated (e.g., every other value or, more generally, 1/N values may be removed from the sorted list, where N is an integer) to bound the size of the observed distribution without sacrificing statistical information.

Alternatively or additionally, the throughput metric determined by electronic device 110-1 may be the ratio of the measured data rate during the communication to an estimated data rate during the communication. Thus, the throughput metric may be the utilization, e.g., the ratio of the data rate during successful communication of packets (as indicated by acknowledgment messages) to the estimated data rate of the communication channel or link. Note that the estimated data rate may be the estimated maximum data rate or throughput as determined using an error-rate model for the communication.

Then, electronic device 110-1 may compare the throughput metric to a threshold value. For example, when the throughput metric is based on the observed distribution, the threshold value may be a target data rate associated with a percentile on the observed distribution, such as a data rate or throughput of 10 kbps for the $50^{th}$ percentile in the observed distribution. Alternatively or additionally, when the throughput metric is the utilization, the threshold value may be a target utilization, such as 90%. Electronic devices having throughput metrics exceeding the threshold value may be selected by electronic device 110-1 as candidate mesh-network nodes.

In the described embodiments, processing a packet or frame in electronic devices 110 includes: receiving the wireless signals with the packet or frame; decoding/extracting the packet or frame from the received wireless signals to acquire the packet or frame; and processing the packet or frame to determine information contained in the packet or frame (such as the feedback about the performance during the communication).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

Figure 2:
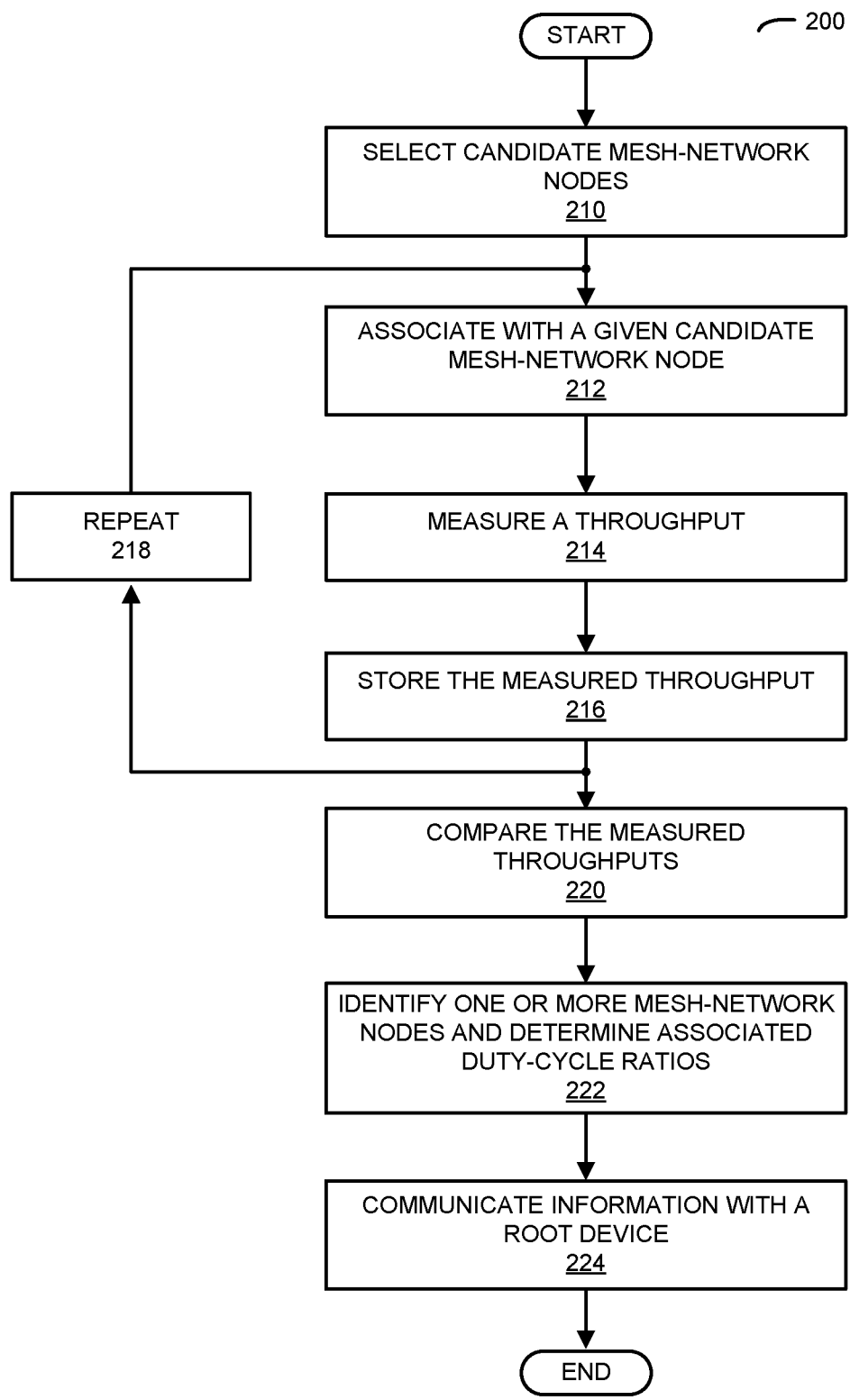
FIG. 2 is a flow diagram illustrating a method for establishing a mesh network during communication among the electronic devices in FIG. 1 in accordance with an embodiment of the present disclosure.
Figure 3:
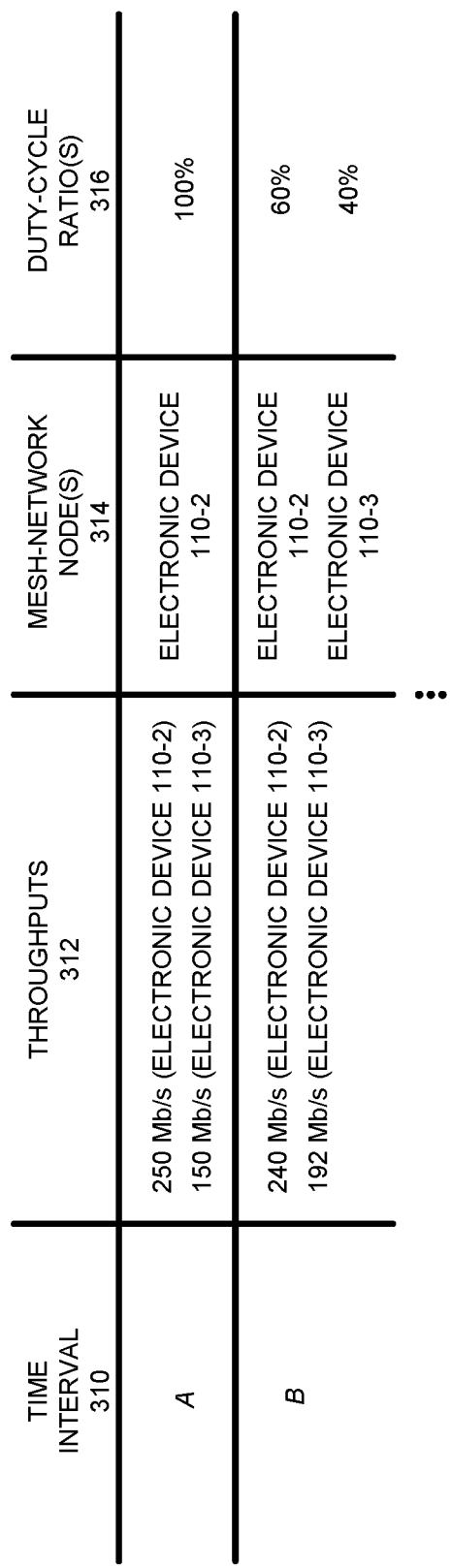
FIG. 3 is a drawing illustrating iterative identification of mesh-network nodes and determination of associated duty-cycle ratios during communication among the electronic devices in FIG. 1 in accordance with an embodiment of the present disclosure.

FIG. 2 presents embodiments of a flow diagram illustrating method 200 for establishing a mesh network that may be performed by an electronic device, such as one of electronic devices 110 in FIG. 1 (e.g., electronic device 110-1), according to some embodiments. During operation, the electronic device selects candidate mesh-network nodes (operation 210) based on estimated throughput metrics of two or more electronic devices to a root device in the mesh network. (Alternatively, in some embodiments the estimated throughput metrics of the two or more electronic devices are to a network, such as the Internet.)

Then, the electronic device performs one or more operations for each of the candidate mesh-network nodes. In particular, the electronic device: associates with a given candidate mesh-network node (operation 212); measures a throughput (operation 214) of the given candidate mesh-network node during a time interval by communicating packets (e.g., by transmitting and receiving the packets); and stores the measured throughput (operation 216) of the given candidate mesh-network node. These operations are repeated (operation 218) at least once for each of the candidate mesh-network nodes. (In subsequent, optional iterations, the operations may be repeated for a selected subset of one or more mesh-network nodes to further refine the analysis. This may allow one of the mesh-network nodes to be ultimately and accurately selected for use in communicating packets between the electronic device and the root device at a given time.)

Next, the electronic device compares the measured throughputs (operation 220). Moreover, the electronic device identifies one or more mesh-network nodes (operation 222) in the candidate mesh-network nodes and determines associated duty-cycle ratios (operation 222) based on the comparisons. Furthermore, the electronic device communicates information with the root device (operation 224) via the one or more mesh-network nodes based on the duty-cycle ratios. For example, the electronic device may communicate packets to the root device via the one or more mesh-network nodes.

In this way, the electronic device (for example, an interface circuit, a driver and/or software executed in an environment of the transmitting electronic device) may facilitate communication with one or more other electronic devices in the mesh network. In particular, the electronic device may identify the one or more mesh-network nodes that increase or optimize the throughput between the electronic device and the root device in the mesh network. This may reduce latency and, thus, may improve the user experience when communicating via the electronic device and the mesh network.

In some embodiments of method 200 (FIG. 2), there may be additional or fewer operations. For example, operations 212-222 in method 200 may be repeated two or more times, so that the one or more mesh-network nodes are identified and the associated duty-cycle ratios are determined iteratively until a convergence criterion is achieved. Moreover, the order of the operations may be changed, and/or two or more operations may be combined into a single operation.

As noted previously, in some embodiments the mesh-network nodes are identified by measuring throughput during wireless communication of packets in the mesh network. For example, the one or more mesh-network nodes may be identified and the associated duty-cycle ratios may be determined based on measured throughputs, which may allow subsequent iterations of the communication technique to be used to converge on one of the mesh-network nodes to use as an uplink neighbor in the mesh network at a given time. This is shown in FIG. 3, which presents a drawing illustrating the identification of one or more mesh-network node(s) 314 and the determination of associated duty-cycle ratio(s) 316 during communication among electronic devices (such as electronic device 110-1 and electronic devices 110-2 and 110-3 in FIG. 1) according to some embodiments. In particular, electronic device 110-1 may track or measure throughputs 312 during time intervals 310 (such as 3 minutes) during the communication. Then, electronic device 110-1 may identify one or more mesh-network node(s) 314 and may determine associated duty-cycle ratio(s) 316. For example, when the measured throughput of electronic device 110-2 is more than 10 or 20% greater than the measured throughput of electronic device 110-3 during time interval A, mesh-network node(s) 314 include electronic device 110-2 and duty-cycle(s) 316 is 100%. Alternatively, when the measured throughput of electronic device 110-2 is within 10 or 20% of the measured throughput of electronic device 110-3 during time interval B, mesh-network node(s) 314—includes electronic devices 110-2 and 110-3 and the associated duty-cycle ratios(s) 316 are 60% and 40%. Note that the duty-cycle ratios may be determined based on the ratio of the measured throughputs. In particular, the ratio of the measured throughputs in time interval B is 0.8, so the duty-cycle ratios are, respectively, 10% above and below 50%.

Figure 4:
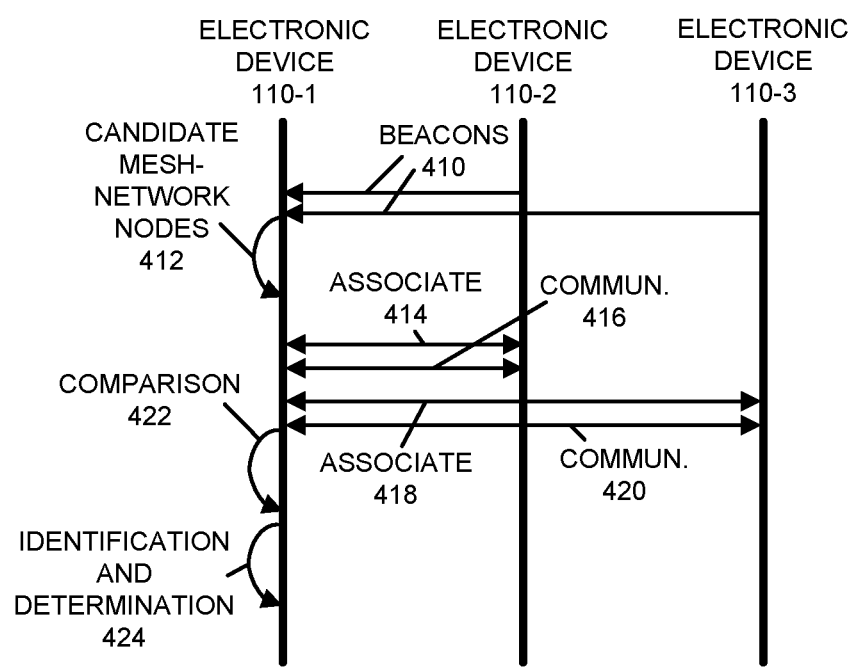
FIG. 4 is a drawing illustrating communication among the electronic devices in FIG. 1 in accordance with an embodiment of the present disclosure.

Embodiments of the communication technique are further illustrated in FIG. 4, which presents a drawing illustrating communication among electronic device 110-1 and electronic devices 110-2 and 110-3 (FIG. 1) according to some embodiments. In particular, during the communication technique electronic device 110-1 may receive beacons 410 from electronic devices 110-2 and 110-3. These beacons may include estimated throughput metrics for electronic devices 110-2 and 110-3, which were previously determined by electronic devices 110-2 and 110-3. Based on the estimated throughput metrics, electronic device 110-1 may select electronic devices 110-2 and 110-3 as candidate mesh-network nodes 412.

Then, electronic device 110-1 may: associate 414 with electronic device 110-2; and measure the throughput of electronic device 110-2 based on communication 416 of packets between electronic devices 110-1 and 110-2. Moreover, electronic device 110-1 may: associate 418 with electronic device 110-3; and measure the throughput of electronic device 110-3 based on communication 420 of packets between electronic devices 110-1 and 110-3.

Next, electronic device 110-1 may compare 422 the measured throughputs. Furthermore, electronic device 110-1 may identify 424 one or more mesh-network nodes and may determine 424 the associated duty-cycle ratios. As noted previously, the one or more mesh-network nodes and the associated duty-cycle ratios may be used in subsequent iterations of the communication technique (and, in particular, measurements of throughputs) to converge on one of the mesh-network nodes to use when communicating packets to the root device in the mesh network at a given time (i.e., to determine the best uplink neighbor of electronic device 110-1 in the mesh network at the given time).

In an exemplary embodiment, measured throughput is used in the communication technique to select an uplink neighbor (i.e., a mesh-network node). In particular, data throughput may change over time. Consequently, when to revisit a neighbor to measure the throughput can be a challenging issue. In order to address this issue, a simulated-annealing technique may be used to search for an approximation to a global optimum in a probabilistic manner. It this approach, the mesh-network node or uplink neighbor may be changed when, based on historical data, a different uplink neighbor is likely offer higher throughput than the current uplink neighbor. The probability of making the uplink switch may be specified by an acceptance probability function that depends on the throughput of candidate uplinks and on a global time-varying parameter, which is temperature. The simulated-annealing technique may initially starts with high temperature, and then decreases it subsequent iterations following an 'annealing schedule' or mean time between change (MTBC).

In this way, the mesh network is expected to change the uplink neighbors with small throughput changes, which become less sensitive as times progresses. At a high simulated-annealing temperature, the mesh network may be very sensitive to changes in the throughput of the current uplink neighbor or mesh-network node. Alternatively, at low simulated-annealing temperature, the mesh network may be less sensitive. Note that the MTBC may control the temperature in the simulated-annealing technique to meet the desired interval between uplink changes. Initially (in first few hours), there may be more frequent uplink changes as the throughputs of the different uplinks are measured, and then may slowly drift toward the MTBC.

For each candidate mesh-network node or candidate uplink neighbor, the electronic device (such as an access point) may maintain several cumulative distribution functions to store uplink throughput measurements and uplink/downlink RSSI. Initially, the throughput may be calculated by mapping an RSSI to a throughput using a predefined conversion table. The throughput of the best candidate mesh-network node based on this mapping may be stored in a cumulative distribution function. Then, this candidate mesh-network node may be compared to another candidate mesh-network node (or candidate uplink neighbor). This comparison may involve the communication technique described previously with reference FIG. 2. The result of this comparison is that one of the candidate mesh-network work nodes is selected as the mesh-network node for use in subsequent communication of packets with the root device in the mesh network. Note that when the mesh-network node or uplink neighbor is switched, it may remain the mesh-network node for at least a minimum uplink hold time (such as 3 minutes, 10 minutes, 1 hour, 3 hours, etc.) in order to get accurate throughput measurements for use in the analysis.

Furthermore, for the current mesh-network node of uplink neighbor, the electronic device may store the uplink throughput and the uplink/downlink RSSI values in a corresponding cumulative-distribution-function data structure. Moreover, the uplink throughput may be compared to that of a neighboring electronic device in the mesh network (i.e., a candidate mesh-network node) after the uplink hold time has expired.

For the candidate mesh-network nodes that are explored, the measured throughputs may be maintained or stored in an uplink throughput history. Then, every five seconds, the median estimated throughput metric to the root device or the core network via the current uplink neighbor is compared to the median estimated throughput metric of the other neighboring electronic devices. The communication technique may use this information to determine whether to switch to a new uplink neighbor or to stay with the current uplink neighbor depending on the potential improvement/degradation. If the estimated throughput metric of the current uplink neighbor is much lower than that of a neighboring electronic device, the electronic device may change the mesh-network node to this neighboring electronic device with a high probability. Alternatively, if the estimated throughput metric of the current uplink neighbor is much higher than the neighboring electronic device, the electronic device may switch the mesh-network node to this neighboring electronic device with a low probability. Note that downlink estimated throughput metric from the parents in the mesh network may not be used in the communication technique in order to reduce the overall complexity.

The end result of the communication technique is that the best neighboring electronic device may be used most frequently and for the majority of time. The other neighboring electronic devices may be tested from time to time. Moreover, the frequency of tests and the average duration of the stay may depend on how much worse the alternative candidate mesh-network nodes are compared to the current uplink neighbor. The worst uplink neighbors may be tested very rarely and only for shorter periods of time.

We now describe embodiments of the electronic device. FIG. 5 presents a block diagram illustrating an electronic device 500, such as one of electronic devices 110 in FIG. 1 (e.g., electronic device 110-1). This electronic device includes processing subsystem 510, memory subsystem 512, and networking subsystem 514. Processing subsystem 510 includes one or more devices configured to perform computational operations. For example, processing subsystem 510 can include one or more microprocessors, application-specific integrated circuits (ASICs), microcontrollers, programmable-logic devices, and/or one or more digital signal processors (DSPs).

Memory subsystem 512 includes one or more devices for storing data and/or instructions for processing subsystem 510 and networking subsystem 514. For example, memory subsystem 512 can include dynamic random access memory (DRAM), static random access memory (SRAM), and/or other types of memory. In some embodiments, instructions for processing subsystem 510 in memory subsystem 512 include: one or more program modules or sets of instructions (such as program module 522 or operating system 524), which may be executed by processing subsystem 510. Note that the one or more computer programs may constitute a computer-program mechanism. Moreover, instructions in the various modules in memory subsystem 512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 510.

In addition, memory subsystem 512 can include mechanisms for controlling access to the memory. In some embodiments, memory subsystem 512 includes a memory hierarchy that comprises one or more caches coupled to a memory in electronic device 500. In some of these embodiments, one or more of the caches is located in processing subsystem 510.

In some embodiments, memory subsystem 512 is coupled to one or more high-capacity mass-storage devices (not shown). For example, memory subsystem 512 can be coupled to a magnetic or optical drive, a solid-state drive, or another type of mass-storage device. In these embodiments, memory subsystem 512 can be used by electronic device 500 as fast-access storage for often-used data, while the mass-storage device is used to store less frequently used data.

Networking subsystem 514 includes one or more devices configured to couple to and communicate on a wired and/or wireless network (i.e., to perform network operations), including: control logic 516, an interface circuit 518 and one or more antennas 520. (While FIG. 5 includes one or more antennas 520, in some embodiments electronic device 500 includes one or more nodes, such as one or more nodes 508, e.g., a pad, which can be coupled to one or more antennas 520. Thus, electronic device 500 may or may not include one or more antennas 520. Note that the one or more nodes may include an input node or an output node.) For example, networking subsystem 514 can include a Bluetooth networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system.

Networking subsystem 514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 500 may use the mechanisms in networking subsystem 514 for performing simple wireless communication between the electronic devices, e.g., transmitting advertising or beacon frames and/or scanning for advertising frames transmitted by other electronic devices as described previously.

Within electronic device 500, processing subsystem 510, memory subsystem 512, and networking subsystem 514 are coupled together using bus 528. Bus 528 may include an electrical, optical, and/or electro-optical connection that the subsystems can use to communicate commands and data among one another. Although only one bus 528 is shown for clarity, different embodiments can include a different number or configuration of electrical, optical, and/or electro-optical connections among the subsystems.

In some embodiments, electronic device 500 includes a display subsystem 526 for displaying information on a display, which may include a display driver and the display, such as a liquid-crystal display, a multi-touch touchscreen, etc.

Electronic device 500 can be (or can be included in) any electronic device with at least one network interface. For example, electronic device 500 can be (or can be included in): a desktop computer, a laptop computer, a subnotebook/netbook, a server, a tablet computer, a smartphone, a cellular telephone, a consumer-electronic device, a portable computing device, an access point, a router, a switch, communication equipment, test equipment, and/or another electronic device.

Although specific components are used to describe electronic device 500, in alternative embodiments, different components and/or subsystems may be present in electronic device 500. For example, electronic device 500 may include one or more additional processing subsystems 510, memory subsystems 512, networking subsystems 514, and/or display subsystems 526. Additionally, one or more of the subsystems may not be present in electronic device 500. Moreover, in some embodiments, electronic device 500 may include one or more additional subsystems that are not shown in FIG. 5. Also, although separate subsystems are shown in FIG. 5, in some embodiments, some or all of a given subsystem or component can be integrated into one or more of the other subsystems or component(s) in electronic device 500. For example, in some embodiments program module 522 is included in operating system 524.

Moreover, the circuits and components in electronic device 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 514, such as a radio. Moreover, the integrated circuit may include hardware and/or software mechanisms that are used for transmitting wireless signals from electronic device 500 and receiving signals at electronic device 500 from other electronic devices. Aside from the mechanisms herein described, radios are generally known in the art and hence are not described in detail. In general, networking subsystem 514 and/or the integrated circuit can include any number of radios. Note that the radios in multiple-radio embodiments function in a similar way to the described single-radio embodiments.

In some embodiments, networking subsystem 514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, calculating the estimated throughput metric, etc.)

While a communication protocol compatible with Wi-Fi was used as an illustrative example, the described embodiments of the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 522, operating system 524 (such as a driver for interface circuit 518) and/or in firmware in interface circuit 518. Alternatively or additionally, at least some of the operations in the communication technique may be implemented in a physical layer, such as hardware in interface circuit 518.

Moreover, while the preceding embodiments illustrated the use of the communication technique and method 200 (FIG. 2) in electronic device 110-1 (FIG. 1), in other embodiments the remedial action is performed: system-wide, per radio, per wireless network, per client, etc. Thus, at least some of the operations in the communication technique and method 200 (FIG. 2) may be performed by a remote electronic device or server. For example, the communication technique may be performed or coordinated system-wide (such as for multiple electronic devices) by a central server.

In the preceding description, we refer to 'some embodiments.' Note that 'some embodiments' describes a subset of all of the possible embodiments, but does not always specify the same subset of embodiments. Moreover, note that the numerical values provided are intended as illustrations of the communication technique. In other embodiments, the numerical values can be modified or changed.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
an interface circuit configured to communicate with second electronic devices, wherein the electronic device is configured to:
select candidate mesh-network nodes to a root device in a mesh network;
measure communication performance metrics of the candidate mesh-network nodes by providing, to one or more output nodes of the electronic device, packets addressed to the candidate mesh-network nodes, and receiving, from one or more input nodes of the electronic device, acknowledgments associated with the candidate mesh-network nodes, wherein a communication performance metric of a given candidate mesh-network node in the candidate mesh-network nodes comprises one of: a measured data rate for successful communication, an estimated data rate for successful communication, or a ratio of the measured data rate to an estimated maximum data rate of a communication channel;

identify one or more mesh-network nodes in the candidate mesh-network nodes and determine associated communication duty-cycle ratios based at least in part on the measured communication performance metrics, wherein a communication duty-cycle ratio of a given mesh-network node in the one or more mesh-network nodes specifies an amount of communication that occurs via the given mesh-network node in the mesh network relative to an amount of communication that occurs via a remainder of the one or more mesh-network nodes in the mesh network; and provide, to the one or more output nodes, information addressed to the root device via the one or more mesh-network nodes based at least in part on the communication duty-cycle ratios, wherein the one or more mesh-network nodes comprise a dynamically determined communication path in the mesh network.

2. The electronic device of claim 1, wherein the candidate mesh-network nodes are selected based at least in part on estimated data rates for successful communication; and wherein the estimated data rate for successful communication of the given candidate mesh-network node in the candidate mesh-network nodes is based at least in part on one of: a received signal strength indication, airtime usage by the given candidate mesh-network node, and an advertised throughput associated with the given candidate mesh-network node.

3. The electronic device of claim 2, wherein at least one of the airtime usage and the advertised throughput are included in beacons communicated in the mesh network.

4. The electronic device of claim 1, wherein the candidate mesh-network nodes are selected based at least in part on estimated data rates for successful communication; and wherein the estimated data rate for successful communication of the given candidate mesh-network node in the candidate mesh-network nodes corresponds to a throughput between the given candidate mesh-network node and the root device in the mesh network and a throughput metric corresponding to a throughput between the given candidate mesh-network node and the electronic device.

5. The electronic device of claim 1, wherein the measured communication performance metrics comprise an uplink throughput.

6. The electronic device of claim 1, wherein the measured communication performance metrics correspond to one hop in the mesh network.

7. The electronic device of claim 1, wherein the communication performance metrics of the candidate mesh-network nodes are measured in a round-robin fashion.

8. The electronic device of claim 1, wherein, when a measured communication performance metric of the given candidate mesh-network node exceeds other measured communication performance metrics by a predefined value, the one or more mesh-network nodes comprise the candidate mesh-network node and the associated communication duty-cycle ratio is one hundred percent; and wherein, when maximum measured communication performance metrics, which are associated with at least two candidate mesh-network nodes, are within a second predefined value of each other, the one or more mesh-network nodes comprise at least the two candidate mesh-network nodes and the associated communication duty-cycle ratios are based at least in part on ratios of the measured communication performance metrics of at least the two candidate mesh-network nodes.

9. The electronic device of claim 1, wherein the operations of measuring, identifying, determining and providing are repeated until a convergence criterion is achieved.

10. The electronic device of claim 1, wherein the one or more mesh-network nodes are identified and the communication duty-cycle ratios are determined using Bayesian analysis.

11. The electronic device of claim 1, wherein the electronic device and the two or more electronic devices comprise access points.

12. The electronic device of claim 1, wherein the electronic device further comprises an antenna coupled to the interface circuit.

13. A non-transitory computer-readable storage medium for use in conjunction with an electronic device, the computer-readable storage medium storing program instructions that, when executed by the electronic device, causes the electronic device to perform operations comprising:

selecting candidate mesh-network nodes to a root device in a mesh network;

measuring communication performance metrics of the candidate mesh-network nodes by providing packets addressed to the candidate mesh-network nodes, and receiving acknowledgments associated with the candidate mesh-network nodes, wherein a communication performance metric of a given candidate mesh-network node in the candidate mesh-network nodes comprises one of: a measured data rate for successful communication, an estimated data rate for successful communication, or a ratio of the measured data rate to an estimated maximum data rate of a communication channel;

identifying one or more mesh-network nodes in the candidate mesh-network nodes and determining associated communication duty-cycle ratios based at least in part on the measured communication performance metrics, wherein a communication duty-cycle ratio of a given mesh-network node in the one or more mesh-network nodes specifies an amount of communication that occurs via the given mesh-network node in the mesh network relative to an amount of communication that occurs via a remainder of the one or more mesh-network nodes in the mesh network; and providing information addressed to the root device via the one or more mesh-network nodes based at least in part on the communication duty-cycle ratios, wherein the one or more mesh-network nodes comprise a dynamically determined communication path in the mesh network.

14. The computer-readable storage medium of claim 13, wherein the candidate mesh-network nodes are selected based at least in part on estimated data rates for successful communication; and wherein the estimated data rate for successful communication of the given candidate mesh-network node in the candidate mesh-network nodes is based at least in part on one of: a received signal strength indication, airtime usage by the given candidate mesh-network node, and an advertised throughput associated with the given candidate mesh-network node.

15. The computer-readable storage medium of claim 13, wherein, when a measured communication performance metric of the given candidate mesh-network node exceeds other measured communication performance metrics by a predefined value, the one or more mesh-network nodes comprise the candidate mesh-network node and the associated communication duty-cycle ratio is one hundred percent; and wherein, when maximum measured communication performance metrics, which are associated with at least two candidate mesh-network nodes, are within a second predefined value of each other, the one or more mesh-network nodes comprise at least the two candidate mesh-network nodes and the associated communication duty-cycle ratios are based at least in part on ratios of the measured communication performance metrics of at least the two candidate mesh-network nodes.

16. The computer-readable storage medium of claim 13, wherein the operations of measuring, identifying, determining and providing are repeated until a convergence criterion is achieved.

17. A method for establishing a mesh network, comprising:

by an electronic device:

selecting candidate mesh-network nodes to a root device in a mesh network;

measuring communication performance metrics of the candidate mesh-network nodes by providing packets addressed to the candidate mesh-network nodes, and receiving acknowledgments associated with the candidate mesh-network nodes, wherein a communication performance metric of a given candidate mesh-network node in the candidate mesh-network nodes comprises one of: a measured data rate for successful communication, an estimated data rate for successful communication, or a ratio of the measured data rate to an estimated maximum data rate of a communication channel;

identifying one or more mesh-network nodes in the candidate mesh-network nodes and determining associated communication duty-cycle ratios based at least in part on the measured communication performance metrics, wherein a communication duty-cycle ratio of a given mesh-network node in the one or more mesh-network nodes specifies an amount of communication that occurs via the given mesh-network node in the mesh network relative to an amount of communication that occurs via a remainder of the one or more mesh-network nodes in the mesh network; and providing information addressed to the root device via the one or more mesh-network nodes based at least in part on the communication duty-cycle ratios, wherein the one or more mesh-network nodes comprise a dynamically determined communication path in the mesh network.

18. The method of claim 17, wherein the measured communication performance metrics comprise an uplink throughput.

19. The method of claim 17, wherein the candidate mesh-network nodes are selected based at least in part on estimated data rates for successful communication; and wherein the estimated data rate for successful communication of the given candidate mesh-network node in the candidate mesh-network nodes is based at least in part on one of: a received signal strength indication, airtime usage by the given candidate mesh-network node, and an advertised throughput associated with the given candidate mesh-network node.

20. The method of claim 17, wherein the measured communication performance metrics correspond to one hop in the mesh network.

* * * * *